US010757387B2

(12) United States Patent
Tsukagoshi (10) Patent No.: US 10,757,387 B2
(45) Date of Patent: Aug. 25, 2020

(54) IMAGE PROCESSING APPARATUS, IMAGE PROCESSING METHOD, AND NON-TRANSITORY COMPUTER READABLE RECORDING MEDIUM

(71) Applicant: CASIO COMPUTER CO., LTD., Shibuya-ku, Tokyo (JP)

(72) Inventor: Takeshi Tsukagoshi, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 69 days.

(21) Appl. No.: 16/138,592

(22) Filed: Sep. 21, 2018

(65) Prior Publication Data

US 2019/0098275 A1    Mar. 28, 2019

(30) Foreign Application Priority Data

Sep. 27, 2017  (JP) .................................. 2017-186894

(51) Int. Cl.
*H04N 9/73* (2006.01)
*G06T 1/20* (2006.01)
*G06T 1/00* (2006.01)
*H04N 9/04* (2006.01)

(52) U.S. Cl.
CPC ........... *H04N 9/735* (2013.01); *G06T 1/0007* (2013.01); *G06T 1/20* (2013.01); *H04N 9/0451* (2018.08)

(58) Field of Classification Search
CPC ....... G06T 1/0007; G06T 1/20; H04N 9/0451; H04N 9/735
See application file for complete search history.

(56) References Cited

U.S. PATENT DOCUMENTS

| 9,094,540 | B2* | 7/2015 | Venable | G03B 37/04 |
| 9,871,976 | B2* | 1/2018 | Nomura | H04N 5/243 |
| 2009/0040335 | A1* | 2/2009 | Ito | H04N 9/735 |
| | | | | 348/223.1 |
| 2012/0188401 | A1* | 7/2012 | Takemoto | H04N 9/735 |
| | | | | 348/223.1 |
| 2014/0078247 | A1* | 3/2014 | Shohara | H04N 9/735 |
| | | | | 348/38 |
| 2016/0012562 | A1* | 1/2016 | Sanno | H04N 5/23296 |
| | | | | 348/221.1 |

FOREIGN PATENT DOCUMENTS

JP        2014078926 A        5/2014

* cited by examiner

*Primary Examiner* — Amy R Hsu
(74) *Attorney, Agent, or Firm* — Holtz, Holtz & Volek PC (57) ABSTRACT

An image processing apparatus has a memory which stores a program and a processor which executes the program stored in the memory to acquire a plurality of picked-up images picked up by a plurality of image pickup systems, calculate a white balance of each of the plurality of acquired picked-up images, set a white balance of a joint of the plurality of picked-up images, individually calculate interpolated values between the calculated white balances and the set white balance of the joint by an interpolation function, individually and continuously vary the white balances in the plurality of picked-up images based on the calculated interpolated values to correct the white balances, individually adjust the plurality of picked-up images based on the calculated white balance of each of the plurality of picked-up images, the white balance of the joint, and the corrected white balances, and synthesize the plurality of adjusted picked-up images to generate a wide angle image.

16 Claims, 6 Drawing Sheets

HORIZONTAL IMAGE PICKUP

GRAVITY (GROUND) DIRECTION

FIG. 3B

VERTICAL IMAGE PICKUP

GRAVITY (GROUND) DIRECTION

IMAGE PROCESSING APPARATUS, IMAGE PROCESSING METHOD, AND NON-TRANSITORY COMPUTER READABLE RECORDING MEDIUM

CROSS-REFERENCE TO RELATED APPLICATIONS

This application is based upon and claims the benefit of priority under 35 USC 119 of Japanese Patent Application No. 2017-186894 filed on Sep. 27 and 2017, the entire disclosure of which, including the description, claims, drawings, and abstract, is incorporated herein by reference in its entirety.

BACKGROUND OF THE INVENTION

1. Field of the Invention

The present invention relates to an image processing apparatus, an image processing method, and a computer readable recording medium.

2. Description of the Related Art

In recent years, in order to pick up images in all directions (hereinafter referred to as "celestial sphere") at once, a celestial sphere image pickup system is known which uses a plurality of wide angle lenses, such as a fisheye lens, for an image pickup apparatus, such as a digital camera.

Japanese Patent Laid-Open No. 2014-078926 describes an image processing apparatus of the celestial sphere pickup system in which, when a plurality of picked-up images are combined, the plurality of picked-up images are divided into regions, and then the white balance of each divided region is adjusted.

SUMMARY OF THE INVENTION

In order to achieve the above-described object, the present invention is grasped by the following configurations.

An image processing apparatus has a memory which stores a program and a processor which executes the program stored in the memory to acquire a plurality of picked-up images picked up by a plurality of image pickup systems, calculate a white balance of each of the plurality of acquired picked-up images, set a white balance of a joint of the plurality of picked-up images, individually calculate interpolated values between the calculated white balances and the set white balance of the joint by an interpolation function, individually and continuously vary the white balances in the plurality of picked-up images based on the calculated interpolated values to correct the white balances, individually adjust the plurality of picked-up images based on the calculated white balance of each of the plurality of picked-up images, the white balance of the joint, and the corrected white balances, and synthesize the plurality of adjusted picked-up images to generate a wide angle image.

An image processing method executed by a processor of an image processing apparatus by executing a program stored in a memory of the image processing apparatus, and the method including acquiring a plurality of picked-up images picked up by a plurality of image pickup systems, individually calculating white balances of the plurality of acquired picked-up images, setting a white balance of a joint of the plurality of picked-up images, individually calculating interpolated values between the calculated white balances and the set white balance of the joint by an interpolation function, individually correcting the white balances by continuously varying the white balances in the plurality of picked-up images based on the calculated interpolated value, individually adjusting the plurality of picked-up images based on the corrected white balances, and synthesizing the plurality of adjusted picked-up images to generate a wide angle image, in which the adjusting the images further executes adjustment of the plurality of picked-up images based on the white balances calculated in the white balance calculation, the white balance of the joint, and the corrected white balances.

A non-transitory computer readable recording medium storing a computer-readable program that is executable by a computer to perform functions including acquiring a plurality of picked-up images picked up by a plurality of image pickup systems, calculating a white balance of each of the plurality of acquired picked-up images, setting a white balance of a joint of the plurality of picked-up images, individually calculating interpolated values between the calculated white balances and the set white balance of the joint by an interpolation function, individually and continuously varying the white balances in the plurality of picked-up images based on the calculated interpolated values to correct the white balances, individually adjusting the plurality of picked-up images based on the calculated white balance of each of the plurality of picked-up images, the white balance of the joint, and the corrected white balances, and synthesizing the plurality of adjusted picked-up images to generate a wide angle image.

DETAILED DESCRIPTION OF THE INVENTION

Hereinafter, an aspect for implementing the present invention (hereinafter referred to as "embodiment") is described in detail with reference to the drawings. The same elements are designated by the same reference numerals throughout in the embodiment of this specification.

An image processing apparatus 1 of the embodiment is described taking a case of being applied to a digital camera as an example.

Figure 1A:
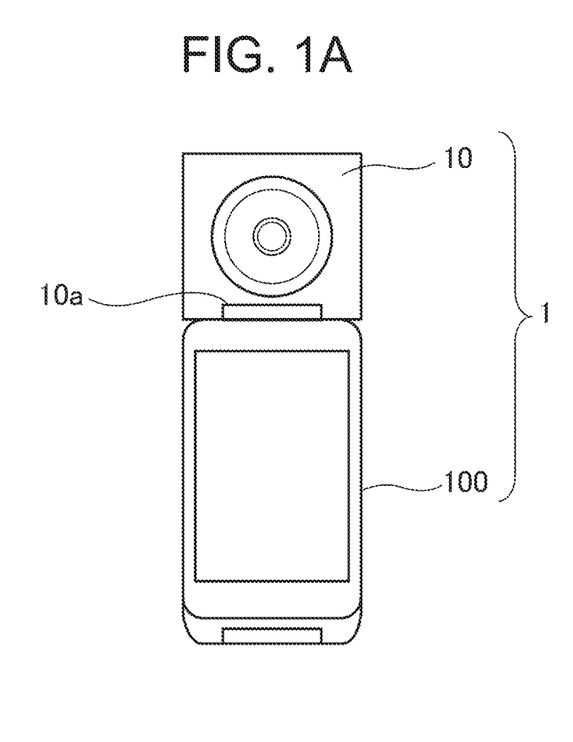
FIG. 1A is a schematic view illustrating a state where an image pickup device 10 and a body device 100 in an image processing apparatus of an embodiment are integrally combined.
Figure 1B:
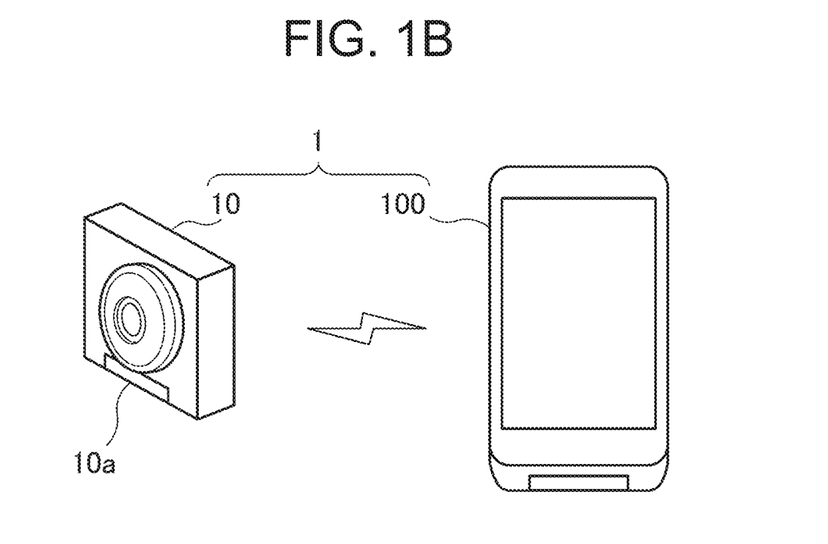
FIG. 1B is a schematic view illustrating a state where the image pickup device 10 and the body device 100 in the image processing apparatus of the embodiment are separated from each other.
Figure 2A:
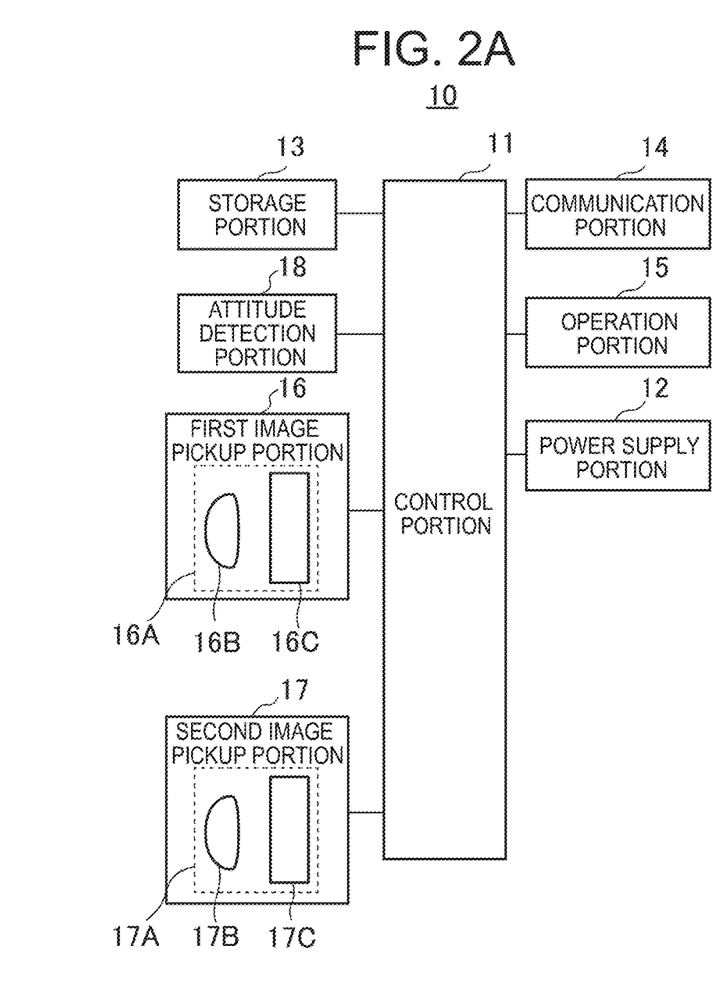
FIG. 2A is a block diagram illustrating the configuration of the image pickup device 10 in the image processing apparatus of the embodiment.
Figure 2B:
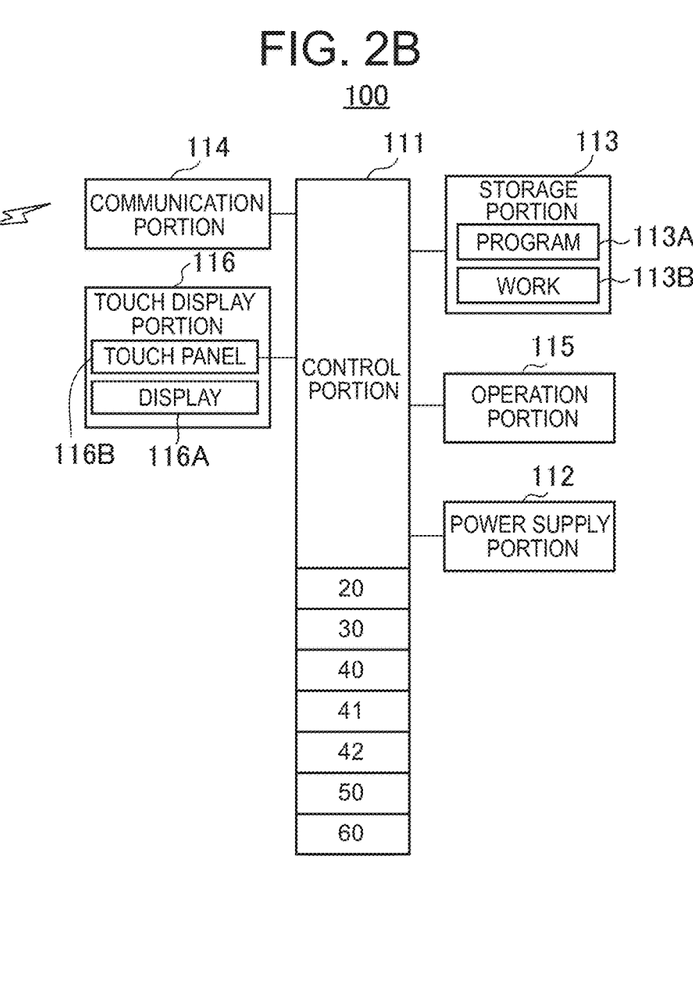
FIG. 2B is a block diagram illustrating the configuration of the body device 100 in the image processing apparatus of the embodiment.

FIGS. 1A and 1B are schematic views illustrating the image processing apparatus 1 of the embodiment, in which FIG. 1A illustrates a state where an image pickup device 10 and a body device 100 are integrally combined and FIG. 1B illustrates a state where the image pickup device 10 and the body device 100 are separated from each other. FIGS. 2A and 2B are block diagrams illustrating the image processing apparatus 1 of the embodiment, in which FIG. 2A illustrates the configuration of the image pickup device 10 and FIG. 2B illustrates the configuration of the image pickup device 100.

As illustrated in FIGS. 1A and 1B, the image processing apparatus 1 is provided with the image pickup device 10 having image pickup systems 16 and 17 described later and the body device 100 and is configured as a separate type digital camera in which the image pickup device 10 and the body device 100 can be separated from each other. However, the body device 100 may be a common portable information terminal, such as a smartphone, a tablet, or a personal computer, insofar as picked-up image data of the image pickup device 10 can be acquired.

As illustrated in FIG. 2A, the image pickup device 10 can pick up still images, moving images, and the like has a casing formed into a box shape and is provided in the casing with a control portion 11, a power supply portion 12, a storage portion 13, a communication portion 14, an operation portion 15, image pickup systems (first image pickup portion 16, second image pickup portion 17), an attitude detection portion 18, and the like.

The control portion 11 is operated by power supply from the power supply portion (rechargeable battery) 12 to control the entire operation of the image pickup device 10 according to various kinds of programs in the storage portion 13. The control portion 11 is provided with a CPU (central processing unit), a memory, and the like which are not illustrated.

The storage portion 13 has a ROM, a flash memory, and the like, for example, and stores programs, various kinds of applications, and the like for realizing an image pickup function. The storage portion 13 may also contain attachable/detachable and portable memories (memory media), such as a SD card and a USB memory, for example, or may be configured so as to perform storing in a storage area of an external server which is not illustrated.

The communication portion 14 transmits a picked-up image to the body device 100 or receives an operation instruction signal and the like from the body device 100. The operation portion 15 is provided with basic operation keys (hardware key), such as a power switch.

Next, the first image pickup portion 16 and the second image pickup portion 17 configure a plurality of image pickup systems (hereinafter sometimes collectively referred to as "image pickup systems 16 and 17").

The first image pickup portion 16 configures a camera portion capable of picking up a subject (or background) and the like with high definition. A lens unit 16A of the first image pickup portion 16 is provided with a fisheye lens 16B, an image pickup element 16C, and the like. In this embodiment, a usual image pickup lens (not illustrated) and the fisheye lens 16B can be exchanged with each other. FIG. 2A illustrates a state where the fisheye lens 16B is mounted.

The fisheye lens 16B contains a lens system of a three-lens configuration, for example, and is a circular fisheye lens (all-around fisheye lens or wide angle lens) capable of picking up images in a wide range where the angle of view is as high as more than 180°. The entire wide angle image (fisheye image) picked up by the fisheye lens 16B is a circular picked-up image G1. In this case, a projection system is employed, and therefore the wide angle image picked up by the fisheye lens 16B is greatly distorted toward an end portion from the center.

More specifically, the picked-up image G1 obtained by the fisheye lens 16B is greatly distorted toward an end portion (peripheral portion) from the center and the image is reduced in the peripheral portion as compared with the center of the wide angle image. Therefore, it becomes very difficult for a user to visually confirm the contents of the peripheral portion in detail even when trying to visually confirm the contents. When a subject image (optical image) obtained by such a fisheye lens 16B is imaged on the image pickup element 16C (for example, CMOS or CCD), an image signal (analog signal) subjected to photoelectric conversion with the image pickup element 16C is converted into a digital signal by an A/D conversion portion (not illustrated) and is subjected to predetermined image processing, and then transmitted to the body device 100 side, so that the subject image is displayed on a monitor.

The second image pickup portion 17 is the same as the first image pickup portion 16 except that the image pickup direction is different from (opposite direction) that of the first image pickup portion 16 and a picked-up wide angle image is a picked-up image G2 and contains a lens unit 17A, a fisheye lens 17B, an image pickup device 17C, and the like.

The attitude detection portion 18 contains a triaxial acceleration sensor detecting the acceleration applied to the image pickup device 10 and the like. The attitude detection portion 18 gives acceleration components in X, Y, and Z directions detected according to the attitude of the image pickup device 10 to the control portion 11. The image pickup device 10 is a box-like casing as described above. When the direction of a short side of the casing is defined as an X-axis direction, the direction of a long side of the casing is defined as a Y-axis direction, and the thickness direction of the casing is defined as a Z-axis direction, the control portion 11 detects a first attitude and a second attitude described later of the image pickup device 10 by comparing the acceleration components in the X axis, the Y axis, and the Z axis, and then transmits attitude information to the body device 100 from the communication portion 14.

Furthermore, the image pickup device 10 is provided with a connection portion 10a to be connected to the body device 100 and is integrally combined with the body device 100 to be configured as a separate type digital camera.

Next, as illustrated in FIG. 2B, the body device 100 configures a controller of a digital camera and also has a reproduction function displaying images picked up by the image pickup device 10. The body device 100 is provided with a control portion 111, a power supply portion 112, a storage portion 113, a communication portion 114, an operation portion 115, and a touch display portion 116.

The control portion 111 is operated by power supply from the power supply portion (rechargeable battery) 112 to control the entire operation of the body device 100 according to various kinds of programs in the storage portion 113. The control portion 111 is provided with a CPU (central processing unit), a memory, and the like which are not illustrated. The control portion 111 (computer) is also configured so as to realize functions as an acquisition unit 20, a white balance calculation unit 30, a correction unit 40 (setting unit 41, interpolated value calculation unit 42), an adjustment unit 50, a generation unit 60, and the like in an image processing process described later according to an image processing program.

The storage portion 113 has a configuration of having non-transitory computer readable recording medium, such as a ROM and a flash memory, for example and has a program memory 113A storing programs, various kinds of applications, and the like for realizing an image pickup function and an image processing function and a work memory 113B temporarily storing various kinds of information required for the body device 100 to operate (for example, flag and the like), for example.

The communication portion 114 transmits and receives various kinds of data between the communication portion 114 and the image pickup device 10. The operation portion 115 is provided with various kinds of keys of a push button type, such as a power button, a release button, and setting buttons of setting image pickup conditions, such as exposure or shutter speed. The control portion 111 executes processing according to an input operation signal from the operation portion 115 or transmits the input operation signal to the image pickup device 10.

The touch display portion 116 is one obtained by laminating and arranging a touch panel 116B on a display 116A of a high definition liquid crystal or the like, in which a display screen serves as a monitoring screen (live view screen) displaying picked-up images in real time or serves as a reproduction screen reproducing picked-up images. On the display 116A, the picked-up image G1 of the first image pickup portion 16, the picked-up image G2 of the second image pickup portion 17, a celestial sphere image GG, and the like may be individually displayed or may be displayed side by side.

The image pickup device 10 and the body device 100 can perform pairing (wireless connection recognition) with each other using wireless communication. As the wireless communication for use in the pairing, wireless LAN (Wi-Fi), Bluetooth (Registered Trademark), infrared communication, and the like are mentioned, for example. Thus, the body device 100 receives and acquires an image (data) picked up by the image pickup device 10, and then displays the image as a live view image on the display 116A. In this embodiment, the image is not limited to stored images and has a broad sense including images displayed on a live view screen (live view image: image before stored).

Figure 3A:
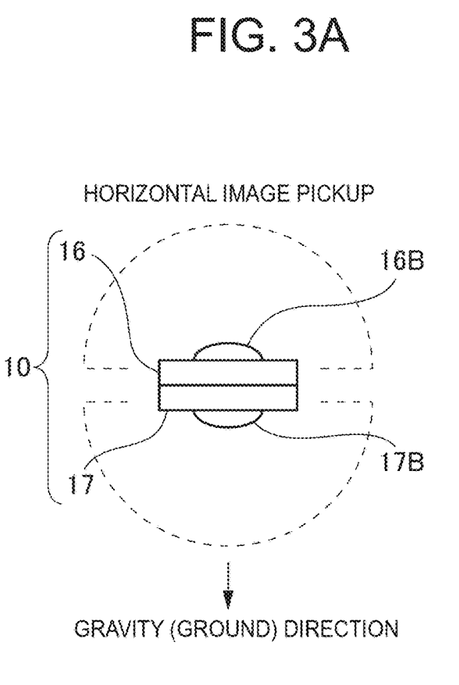
FIG. 3A is a schematic view illustrating a first attitude of the image pickup device 10.
Figure 3B:
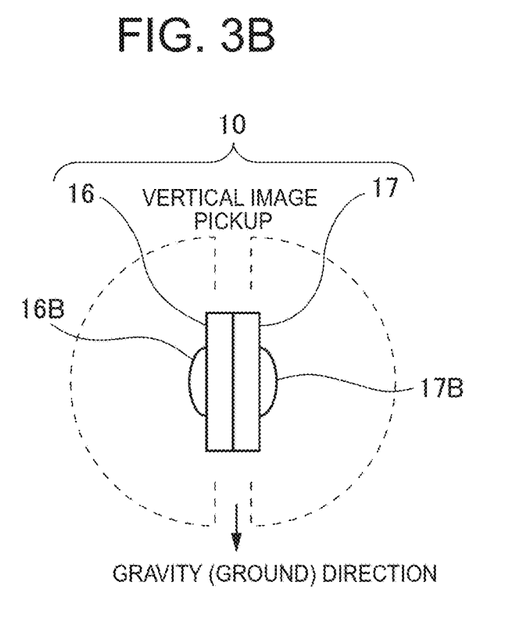
FIG. 3B is a schematic view illustrating a second attitude of the image pickup device 10.

FIGS. 3A and 3B are schematic views of the image pickup device 10, in which FIG. 3A illustrates a first attitude thereof and FIG. 3B illustrates a second attitude thereof.

When images are picked up using the image pickup device 10, wide angle images are individually processed supposing that the image pickup device 10 is in the first attitude or the second attitude. The first attitude is a horizontal image pickup attitude in which the optical axis directions of the fisheye lenses 16B and 17B of the image pickup systems 16 and 17 disposed in a front central portion of the image pickup device 10 are substantially parallel to the gravity direction as illustrated in FIG. 3A. The second attitude is a vertical image pickup attitude in which the optical axis directions of the fisheye lenses 16B and 17B of the image pickup device 10 are substantially vertical to the gravity direction as illustrated in FIG. 3B.

Hereinafter, an image pickup range and the like are described about a case where images are picked up with the vertical image pickup attitude using the image pickup device 10.

Figure 4A:
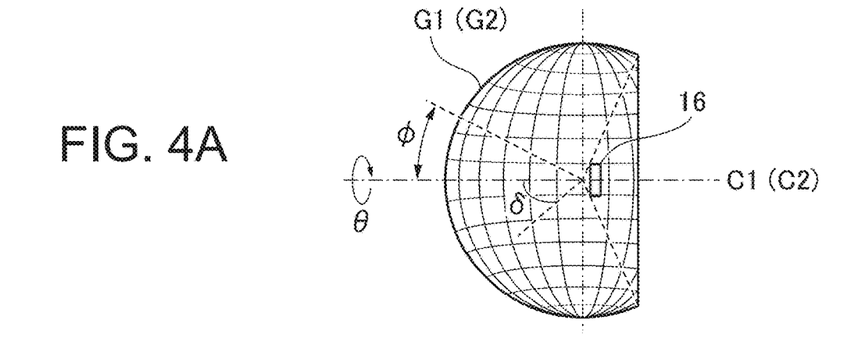
FIG. 4A is a view illustrating an image pickup range of the image pickup device 10.
Figure 4B:
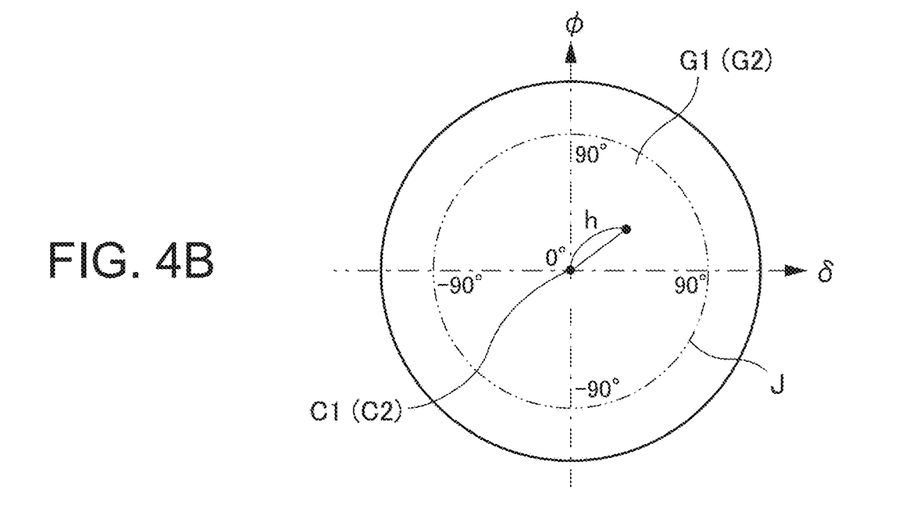
FIG. 4B is a view illustrating a wide angle image displayed on a display.
Figure 4C:
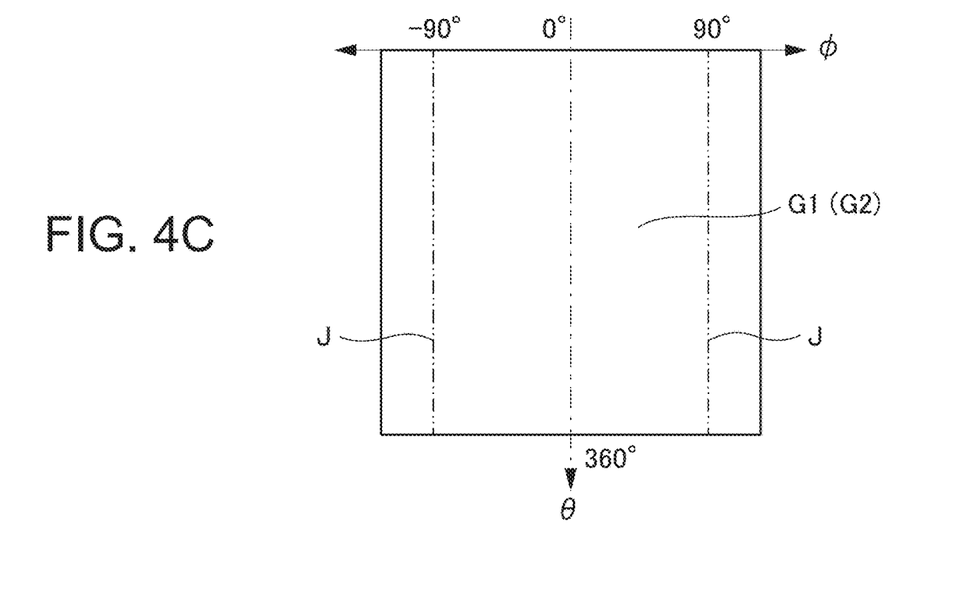
FIG. 4C is a view illustrating a wide angle image expressed by the spherical coordinate system.
Figure 5:
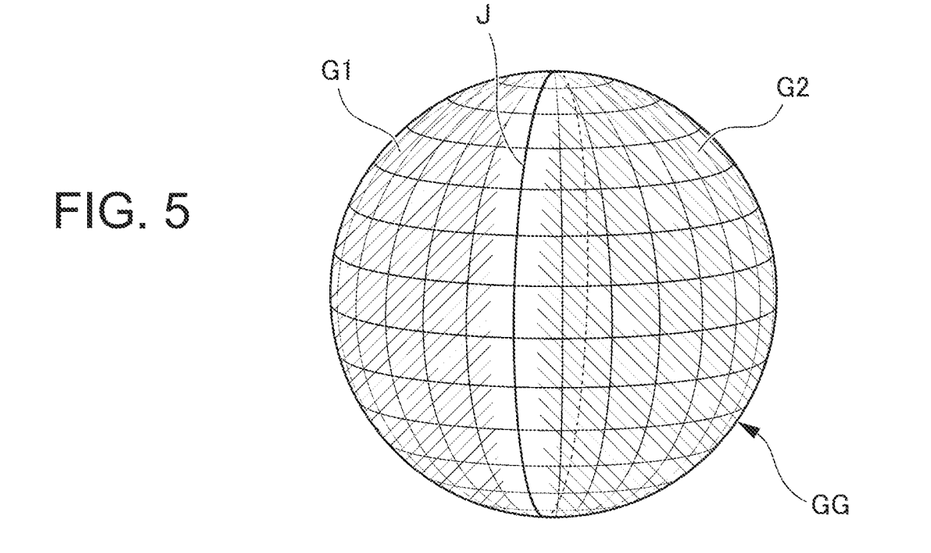
FIG. 5 is a diagram illustrating a synthesized celestial sphere image.
Figure 6A:
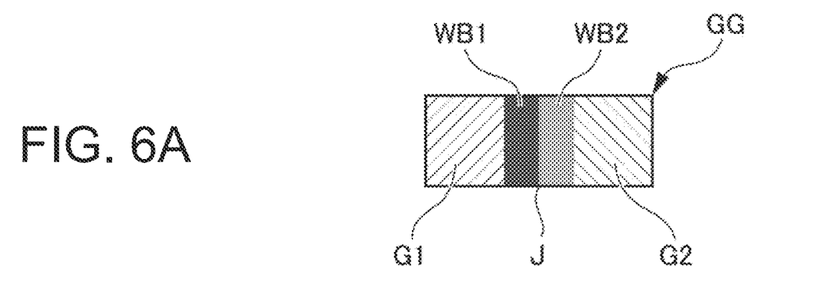
FIG. 6A is a diagram illustrating a state where the color tones in a joint of the celestial sphere image are differ from each other.
Figure 6B:
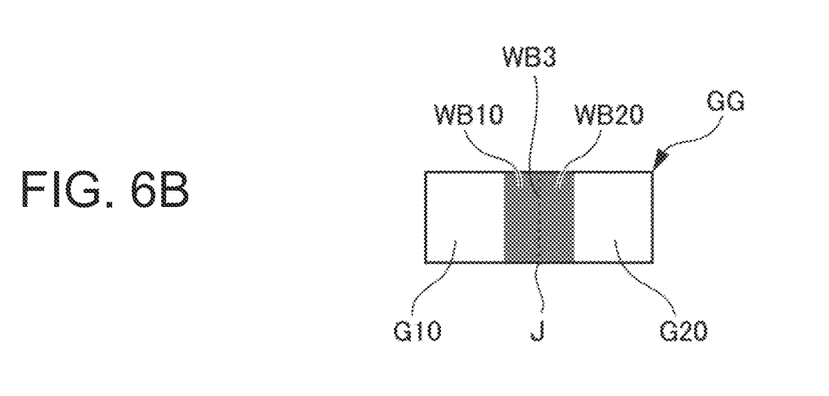
FIG. 6B is a diagram illustrating a state where the color tones are consistent.

FIGS. 4A, 4B, and 4C are diagrams, in which FIG. 4A illustrates an image pickup range of the image pickup device 10, FIG. 4B illustrates a wide angle image to be displayed on the display 116A, and FIG. 4C illustrates a wide angle image expressed by the spherical coordinate system. FIG. 5 is a diagram illustrating a synthesized celestial sphere image GG. FIG. 6 are diagrams, in which FIG. 6A illustrates a state where the color tones are different from each other in a joint J of the celestial sphere images GG and FIG. 6B illustrates a state where the color tones are consistent in the joint J.

The image pickup range of the first image pickup portion 16 is a range including directions included in a substantially hemisphere from an image pickup point (image pickup element 16C) as illustrated in FIG. 4A. The rotation angle around the axis of the optical axis C1 of the first image pickup portion 16 is defined as a rotation angle $\theta$. The rotation angle in the left-and-right horizontal direction with respect to the optical axis C1 is defined as a horizontal angle $\delta$. The rotation angle in the up-and-down vertical (gravity) direction with respect to the optical axis C1 is defined as a vertical angle $\phi$. The image pickup range of the second image pickup portion 17 is substantially equal to the image pickup range of the first image pickup portion 16 except that the image pickup direction is opposite to the direction of the optical axis C1, i.e. the horizontal angle $\delta$ is different by 180°. The maximum ranges of the general horizontal angle $\delta$ and the general vertical angle $\phi$ exceed −90° to +90° and are about −105° to +105° (or exceed 180° and are about 210°). In other words, the image pickup ranges of the first image pickup portion 16 and the second image pickup portion 17 are sizes somewhat exceeding the hemisphere.

When the picked-up images G1 and G2 picked up by the image pickup systems 16 and 17 are displayed as wide angle images on the display 116A, the picked-up image G1 is displayed by the generation of pixel images with an image height h corresponding to the incident angle with respect to the optical axis C1, i.e., vertical angle $\phi$, as illustrated in FIG. 4B. More specifically, the picked-up images G1 and G2 can be expressed by the polar coordinate system. The relationship between the image height h and the incident angle $\phi$ is determined by a projection function according to a projection model. The picked-up image G2 is the same as the picked-up image G1.

Furthermore, when the picked-up images G1 and G2 are expressed by a spherical coordinate system, the picked-up images G1 and G2 can be expressed as the arrangement with the rotation angle $\theta$ and the vertical angle $\phi$ as coordinates, i.e., coordinate value $(\theta, \phi)$, as illustrated in FIG. 4C. The rotation angle $\theta$ is within the range of 0 to 360° (or −180° to +180°) and the vertical angle $\phi$ is within the range of −90° to +90° (or 0 to 180°).

The celestial sphere image GG is obtained by joining hemispherical portions of the picked-up images G1 and G2 at the joint J as illustrated in FIG. 5. When a subject is picked up by the image pickup systems 16 and 17, an overlapping region is present which includes image portions of the subject, a background, and the like reflected in common to the image pickup systems 16 and 17 (particularly range in which the horizontal angle δ and the vertical angle φ exceed −90° to +90°). Therefore, the overlapping region serves as the reference for joining images as reference data illustrating the same image, and thus the joints J are set.

Even in the case of a conventional image processing method, a subject, a background, and the like are not combined and synthesized in an inconsistent state in the joints J of the celestial sphere images GG, and thus a continuous state is formed as an image but the color tones (particularly white balances WB1, WB2) are different from each other between the picked-up images G1 and G2 with the joint J (refer to FIG. 6A) as the boundary. Then, in this embodiment, the picked-up images G1 and G2 are subjected to the following image processing to obtain picked-up images G10 and G20 with reduced different color tones or with no different color tones, and then the celestial sphere image GG is synthesized (refer to FIG. 6B).

The image processing process is described.

Figure 7:
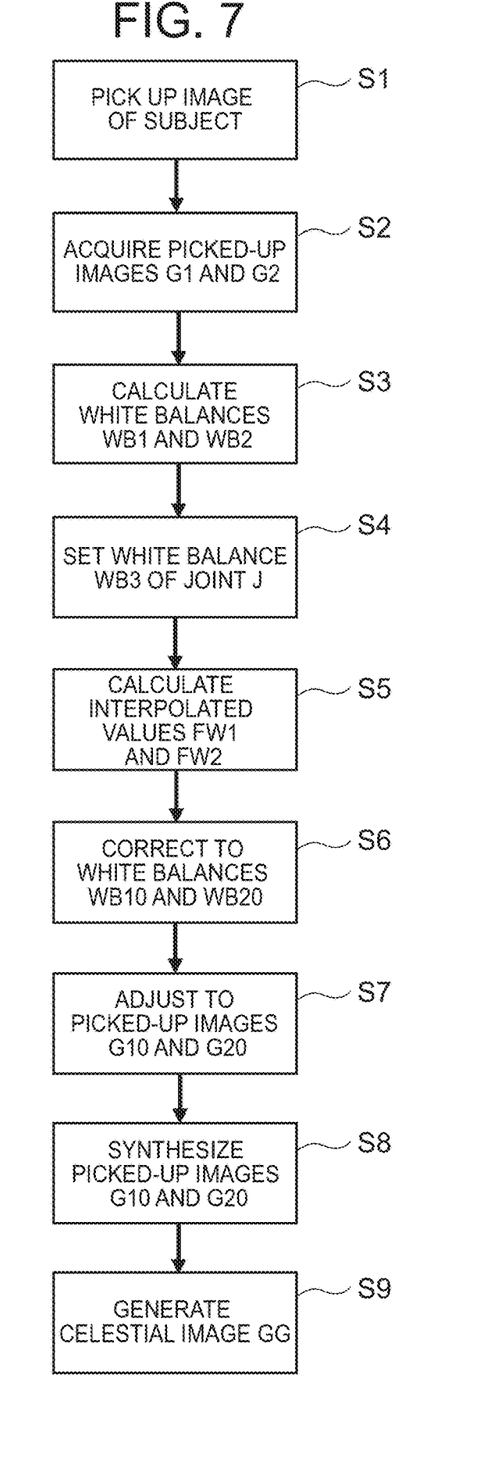
FIG. 7 is a flow chart illustrating an image processing process.

FIG. 7 is a flow chart illustrating an image processing process. However, for processing (distortion correction processing) of correcting distortion of a wide angle image, processing (celestial sphere synthesizing processing) of combining hemisphere images to synthesize the celestial sphere image GG, and the like, well-known techniques generally used in image processing are usable, and therefore a description is omitted.

First, in Step S1, a subject is picked up by the two image pickup systems 16 and 17 using the image pickup device 10.

In Step S2, the picked-up images G1 and G2 picked up by the image pickup systems 16 and 17 are acquired into the body device 100 by the acquisition unit 20.

In Step S3, the white balance calculation unit 30 analyzes the acquired picked-up images G1 and G2, and then calculates the white balances WB1 and WB2 in the picked-up images G1 and G2. At this time, the analysis of the picked-up images G1 and G2 is performed using a table according to the type of light sources in the image pickup and the like.

In Step S4, when the picked-up images G1 and G2 are combined and synthesized, the setting unit 41 of the correction unit 40 sets a white balance (value) WB3 of a portion serving as the joint J. As the white balance WB3, a value included between the white balance W1 of a portion (boundary) corresponding to the joint J in the picked-up image G1 and the white balance W2 of a portion corresponding to the joint J in the picked-up image G2, e.g., an average value between the white balance W1 and the white balance W2, is preferably set. However, when image processing is additionally performed in addition thereto, the white balance WB3 may not be included between the white balances W1 and W2 and may be a larger value or a smaller value. Moreover, the white balance (value) WB3 may be a fixed value or may be a value set by a user. The white balance (value) WB3 is usually the same value. However, the image pickup systems 16 and 17 have individual differences, and therefore the white balance (value) WB3 may slightly vary insofar as the value gives the same color tone in the joints J in the picked-up images G10 and G20 after adjusting the white balances of the picked-up images G1 and G2.

In Step S5, the interpolated value calculation unit 42 of the correction unit 40 individually calculates interpolated values FW1 and FW2 between the white balances WB1 and WB2 calculated in Step S3 by an interpolation function fx and the white balance WB3 set in Step S3.

The interpolation function fx used herein includes linear interpolation (linear function interpolation), spline interpolation (quadratic function interpolation, cubic function interpolation, . . . Nth function interpolation), and the like.

In Step S6, the correction unit 40 corrects the white balances WB1 and WB2 in the picked-up images G1 and G2 to white balances WB10 and WB20 based on the interpolated values FW1 and FW2 calculated in Step S5.

At this time, the white balances WB10 and WB20 are gradually varied with a gradient from the center (optical axes C1, C2) of the picked-up images G1 and G2 toward a high image height side (image end) (see FIG. 4B), so that a white balance value at the joint J of the picked-up images G1 and G2 is the white balance WB3. However, the center of each of the picked-up images G1 and G2 does not necessarily need to be in alignment with the center (optical axes C1, C2) of the image pickup range of each of the fisheye lenses 16B and 17B and decentered positions in non-alignment with the center, such as a specific subject's gravity or a highest brightness point (whitest point), may be selected.

In Step S7, the adjustment unit 50 adjusts the picked-up images G1 and G2 based on the white balances WB1 and WB2 calculated in Step S3 and the white balance WB3 of the joint J set in Step 4 in addition to the white balances WB10 and WB20 corrected in Step S6. As a result, the picked-up images G1 and G2 are the picked-up images G10 and G20 with adjusted white balances. At this time, each of the white balance values of portions corresponding to the joints J in the picked-up images G10 and G20 is the WB3.

In Step S8, the generation unit 60 synthesizes the picked-up images G10 and G20 adjusted in Step S7 with the joints J as the boundary.

Thus, in Step S9, the celestial sphere image GG in which the joints J are not conspicuous can be obtained from the plurality of picked-up images G1 and G2 different in the white balances W1 and W2 of original images.

As described above, the image processing apparatus 1 of this embodiment is provided with the acquisition processing of acquiring the plurality of picked-up images G1 and G2 picked up by the plurality of image pickup systems 16 and 17, the white balance calculation processing of individually calculating the white balances WB1 and WB2 in the plurality of picked-up images G1 and G2 acquired by the acquisition processing, the correction processing of individually correcting the white balances WB1 and WB2 calculated by the white balance calculation processing, the adjustment processing of individually adjusting the plurality of picked-up images G1 and G2 based on the white balances WB10 and WB20 corrected by the correction processing, and the generation processing of generating the celestial sphere image GG by synthesizing the plurality of picked-up images G10 and G20 adjusted by the adjustment processing. The correction processing has the setting processing of setting the white balance WB3 of the joint J between the plurality of picked-up images G1 and G2 and the interpolated value calculation processing of individually calculating the interpolated values FW1 and FW2 between the white balances WB1 and WB2 calculated by the white balance calculation processing and the white balance WB3 of the joint J set by the setting processing by the interpolation function fx. The correction processing includes individually and continuously varying the white balances WB1 and WB2 in the plurality of picked-up images G1 and G2 based on the interpolated values FW1 and FW2 calculated by the interpolated value calculation processing, and then corrects the white balances WB1 and WB2. The adjustment processing includes individually adjusting the plurality of picked-up images G1 and G2 based on the white balances WB1 and WB2 calculated by the white balance calculation processing and the white balance WB3 of the joint J in addition to the white balances WB10 and WB20 corrected by the correction processing.

Thus, the white balances of portions corresponding to the joints J in the adjusted picked-up images G10 and G20 are equal (consistent) to each other. Therefore, when the plurality of picked-up images G1 and G2 which were picked up are synthesized to generate the celestial sphere image GG, a difference in color tone generated in the joints J can be reduced.

In the embodiment, the white balance WB3 set to the joint J is a value included between the corresponding white balances WB1 and WB2. Thus, the white balances WB1 and WB2 in the picked-up images G1 and G2 are corrected on the average. However, the white balance WB3 set to the joint J may be an average value of the corresponding white balances WB1 and WB2 or may be close to the white balance WB1 or WB2 in one of the picked-up images G1 and G2 according to a subject or an image pickup environment.

In the embodiment, the correction unit 40 continuously varies the white balance WB10 from a predetermined position of the image, e.g., center, (optical axes C1, C2) toward the high image height side (image end) in one of the plurality of picked-up images G1 and G2 based on the interpolated value FW calculated by the interpolated value calculation unit 42. Thus, the adjusted picked-up images G10 and G20 can be formed into more natural and smoother images.

In the embodiment, by the use of the alignment interpolation for the interpolation function fx, the calculation speed of the interpolated values FW1 and FW2 can be increased and the image adjustment of the picked-up images G1 and G2 can be accelerated. Moreover, by the use of the spline interpolation for the interpolation function fx, the white balances WB10 and WB20 can be made more natural and smoother and the adjusted picked-up images G10 and G20 can be formed into more natural and smoother images.

As described above, a preferable embodiment of the present invention is described in detail but the image processing apparatus, the image processing method, and the program according to the present invention are not limited to the embodiment described above and can be variously modified or altered within the scope of the present invention described in Claims.

(Modification)

Although the correction unit 40 individually corrects the white balances WB1 and WB2 in the picked-up images G1 and G2 in the above-described embodiment, the correction unit 40 may perform the correction for at least one of the plurality of picked-up images G1 and G2, i.e., only one picked-up images G1 and G2, e.g., only the white balance WB2 in the picked-up image G2. In other words, a white balance value in a portion corresponding to the joint J in the picked-up image G1 is used for the white balance WB3 of the joint J and the interpolated value FW2 between the white balance WB2 in the picked-up image G2 and the white balance WB3 set by the setting unit 41 may be used. Then, the white balance WB2 in the picked-up image G2 may be continuously varied based on the calculated interpolated value FW2.

Moreover, the brightness (for example, exposure AE) may be different from each other in addition to the color tone (white balances WB1, WB2) in the picked-up images G1 and G2. Then, image processing may be performed so as to reduce or eliminate the brightness difference. The exposure AE means a degree determined by a diaphragm value (F value) and exposure time (shutter speed). The exposure value which is the magnitude of the degree is expressed in a unit "EV". Similarly also in this case, the same value, a value between the exposures of portions corresponding to the joints J, or the like may be set as the exposure of the joints J of the plurality of picked-up images G1 and G2. In detail, an exposure value calculation processing includes individually calculates the exposure values in the picked-up images G1 and G2. An exposure value setting processing of the correction processing includes setting an exposure value of the joints J of the plurality of picked-up images G1 and G2. An exposure interpolated value calculation processing of the correction processing includes individually calculating exposure interpolated values between the exposure values calculated by the exposure value calculation processing and the exposure value set by the exposure value setting processing by the interpolation function fx. The correction processing includes individually and continuously varying the exposure values in the picked-up images G1 and G2 based on the calculated exposure interpolated values.

Although the number of the picked-up images G1 and G2 are two in the embodiment described above, three or more of the picked-up images G1 and G2 may be acceptable. In this case, two images may be subjected to image processing to be synthesized.

Although the image processing apparatus 1 is the separate type in which the image pickup device 10 and the body device 100 can be separated from each other in the embodiment described above, an integral type may be acceptable in which the image pickup device 10 and the body device 100 cannot be separated from each other.

Although the generation unit 60 generates the celestial sphere image GG by synthesizing the plurality of picked-up images G10 and G20 adjusted with the adjustment unit 50 in the embodiment described above, the present invention is not limited thereto and wide angle images, such as a panorama image, may be generated.

Although the image processing is performed without considering the individual differences in characteristics of the image pickup systems 16 and 17 in the embodiment described above, the image processing may be performed considering the individual differences in characteristics of the image pickup systems. More specifically, the setting may be performed so that the image processing is performed considering the characteristic of only one of the image pickup systems 16 and 17, e.g., the image pickup system 16, and cancelling the characteristic of the image pickup system 17. Moreover, the characteristics of the image pickup systems may be set so that the characteristics of the image pickup systems are averaged.

What is claimed is:

1. An image processing apparatus comprising:
   a memory which stores a program; and
   a processor which executes the program stored in the memory to:
      acquire a plurality of picked-up images picked up by a plurality of image pickup systems,
      calculate a white balance of each of the plurality of picked-up images,
      set a white balance of a joint of the plurality of picked-up images, the white balance of the joint being a value between the calculated white balances,
      individually calculate interpolated values between the calculated white balances and the set white balance of the joint by an interpolation function, individually and continuously vary the white balances in the plurality of picked-up images based on the calculated interpolated values to correct the white balances, individually adjust the plurality of picked-up images based on the calculated white balance of each of the plurality of picked-up images, the white balance of the joint, and the corrected white balances, and synthesize the plurality of adjusted picked-up images to generate a wide angle image.

2. The image processing apparatus according to claim 1, wherein the wide angle image comprises a celestial sphere image.

3. The image processing apparatus according to claim 1, wherein the processor corrects the calculated white balance for at least one picked-up image among the plurality of picked-up images.

4. The image processing apparatus according to claim 1, wherein the processor continuously varies the white balance in at least one picked-up image among the plurality of picked-up images from a predetermined position of the image to an image end thereof, based on the calculated interpolated value.

5. The image processing apparatus according to claim 1, wherein the interpolation function includes alignment interpolation or spline interpolation.

6. The image processing apparatus according to claim 1, wherein the processor:

individually calculates exposure values in the plurality of picked-up images, sets an exposure value of the joint of the plurality of picked-up images, individually calculates exposure interpolated values between the calculated exposure values and the set exposure value by the interpolation function, and individually and continuously varies the calculated exposure values based on the calculated exposure interpolated values.

7. An image processing method executed by a processor of an image processing apparatus by executing a program stored in a memory of the image processing apparatus, the method comprising:

acquiring a plurality of picked-up images picked up by a plurality of image pickup systems, individually calculating a white balance of each of the plurality of picked-up images, setting a white balance of a joint of the plurality of picked-up images, the white balance of the joint being a value between the calculated white balances, individually calculating interpolated values between the calculated white balances and the set white balance of the joint by an interpolation function, individually correcting the white balances by continuously varying the white balances in the plurality of picked-up images based on the calculated interpolated value, individually adjusting the plurality of picked-up images based on the calculated white balance of each of the plurality of picked-up images, the white balance of the joint, and the corrected white balances, and synthesizing the plurality of adjusted picked-up images to generate a wide angle image.

8. The image processing method according to claim 7, wherein the correcting the white balance is performed for at least one picked-up image among the plurality of picked-up images.

9. The image processing method according to claim 7, wherein the correcting the white balance comprises continuously varying the white balance in at least one picked-up image among the plurality of picked-up images from a predetermined position of the image to an image end thereof, based on the calculated the interpolated value.

10. The image processing method according to claim 7, wherein the interpolation function includes alignment interpolation or spline interpolation.

11. The image processing method according to claim 7, further comprising:

individually calculating exposure values in the plurality of picked-up images, wherein the correcting the white balance comprises:

setting an exposure value of the joint of the plurality of picked-up images, individually calculating exposure interpolated values between the calculated exposure values and the set exposure value of the joint by the interpolation function, and individually and continuously varying the calculated exposure values based on the calculated exposure interpolated values.

12. A non-transitory computer readable recording medium storing a computer-readable program that is executable by a computer to perform functions comprising:

acquiring a plurality of picked-up images picked up by a plurality of image pickup systems, calculating a white balance of each of the plurality of picked-up images, setting a white balance of a joint of the plurality of picked-up images, the white balance of the joint being a value between the calculated white balances, individually calculating interpolated values between the calculated white balances and the set white balance of the joint by an interpolation function, individually and continuously varying the white balances in the plurality of picked-up images based on the calculated interpolated values to correct the white balances, individually adjusting the plurality of picked-up images based on the calculated white balance of each of the plurality of picked-up images, the white balance of the joint, and the corrected white balances, and synthesizing the plurality of adjusted picked-up images to generate a wide angle image.

13. The non-transitory recording medium according to claim 12, wherein the calculated white balance is corrected for at least one picked-up image among the plurality of picked-up images.

14. The non-transitory recording medium according to claim 12, wherein the white balance in at least one picked-up image among the plurality of picked-up images is continuously varied from a predetermined position of the image to an image end thereof, based on the calculated interpolated value.

15. The non-transitory recording medium according to claim 12, wherein the interpolation function includes alignment interpolation or spline interpolation.

16. The non-transitory computer readable recording medium according to claim 12, the computer-readable program being executable by the computer to perform further functions comprising:

individually calculating exposure values in the plurality of picked-up images, wherein:

an exposure value of the joint of the plurality of picked-up images is set,
exposure interpolated values between the calculated exposure values and the set exposure value are individually calculated by the interpolation function, and
the calculated exposure values are individually and continuously varied based on the calculated exposure interpolated values.

* * * * *